Patented Dec. 15, 1936

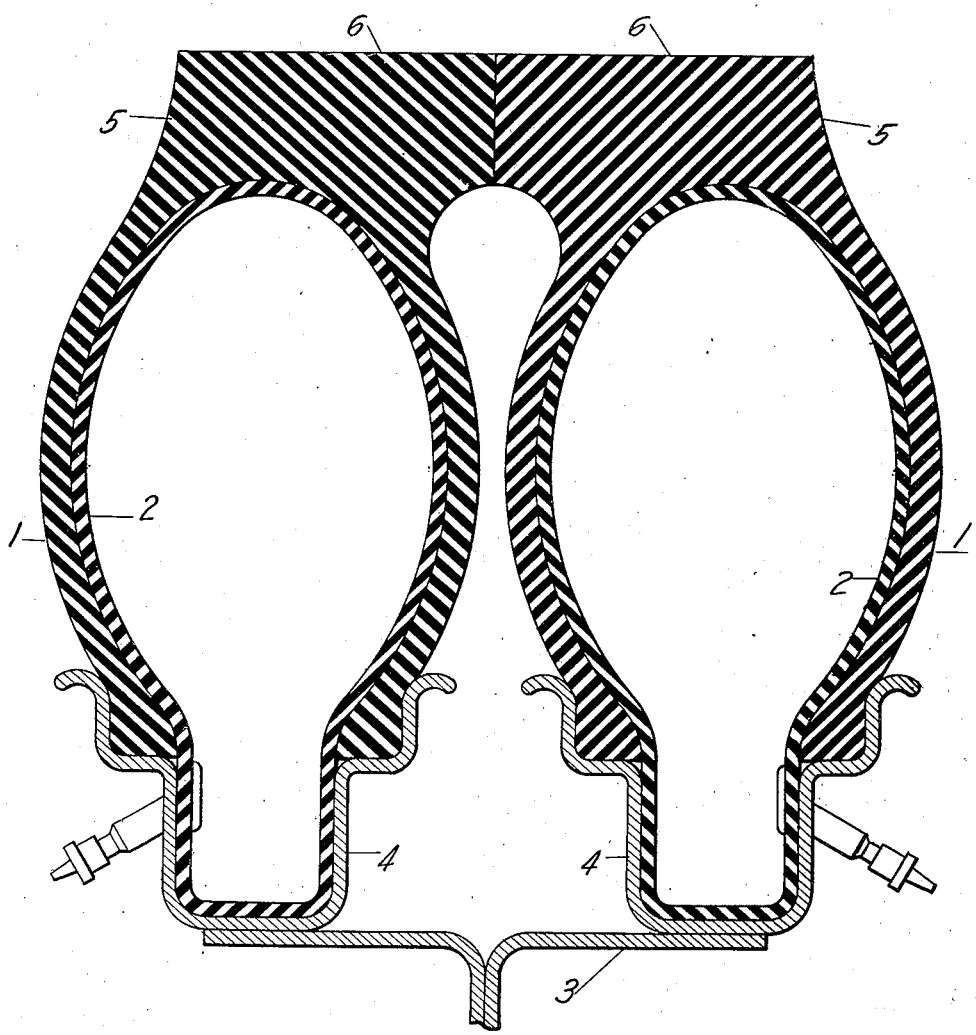

2,064,694

UNITED STATES PATENT OFFICE 2,064,694

PNEUMATIC TIRE

Herbert R. Simonds, Oakwood, Ohio

Application May 18, 1936, Serial No. 80,277

7 Claims. (Cl. 152—22)

This invention relates to pneumatic tires for automobiles or other vehicles and one object of the invention is to provide such a tire comprising two units, either of which will support the vehicle when the other is deflated, thereby preventing the sudden collapse of the tire in the event of a blowout or other failure of one unit.

A further object of the invention is to provide such a tire in which the two units will not be liable to injury by frictional contact or by the entrance of foreign matter between the same.

A further object of the invention is to provide such a tire having means for preventing the entrance of foreign matter between the two units.

A further object of the invention is to provide such a tire comprising two units which will have substantially the appearance of a single tire.

Other objects of the invention may appear as the tire is described in detail.

The accompanying drawing is a section taken transversely through a tire embodying my invention.

In this drawing I have illustrated one embodiment of the invention and have shown the same as comprising two separately inflatable tire units, each including a casing 1 and an inner tube 2, so that each unit constitutes a complete tire in itself. The two units may be mounted side by side on a single wheel of a vehicle in any suitable manner. In the arrangement here illustrated the two units are mounted on a rim comprising a part 3, which is secured to the wheel, and parallel tire receiving parts 4, each in the form of a conventional tire rim. While the parts 4 are shown as formed separately from the part 3 they may, if desired, be made integral therewith.

The casing of each unit is oval in cross section, with its major axis extending radially, and is provided with a tread 5. These treads are so arranged that when the units are inflated the adjacent sides of the two treads will contact one with the other. Preferably each tread has a portion 6 extending laterally toward the other tread and adapted to contact with the laterally extending portion of said other tread, thus holding the two units against movement one toward the other and forming a tight closure between the treads which will prevent the entrance of gravel or other foreign matter between the two units. In the present construction the contact surfaces of the treads are flat and are arranged in a radial line extending between the two casings.

The casings of the two units are of such width that when inflated to normal pressure the adjacent side walls thereof will be out of contact one with the other, the space between said side walls being such that under normal load the tires will not be distorted sufficiently to cause contact between the walls, and the contact between the treads will prevent the bodily movement of the units one toward the other. However, should these side walls contact one with the other, due to over-inflation or excessive load, no injury will result because the area of contact will be quite narrow and the two walls will have very little relative movement. Hence the frictional contact between the same would not be serious, and obviously the walls may be provided with protecting coverings, if desired.

Due to the oval shape of the units and the shape of the treads the tire as a whole, when inflated, will have substantially the appearance of a single pneumatic tire with a continuous tread. Under normal conditions the two units will function as a single tire, the load being divided substantially equally between the same. Should one unit be deflated, due to a blowout, a puncture or other cause, the tire as a whole will not collapse but the inflated unit will support the vehicle and enable the same to be driven to a service station where the necessary repairs may be made or another unit substituted for the deflated unit. As is well known the sudden collapse of a tire, particularly of a tire on a front wheel of an automobile, is liable to cause the driver to lose control of the automobile, with disastrous results, and this danger is eliminated by the present tire, as the possibility of both units collapsing simultaneously is remote.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A pneumatic tire comprising two separately deflatable units each having a casing provided with a tread, means for separately mounting said units side by side on the rim of a vehicle wheel, said mounting means being so arranged that the adjacent side walls of said units will be normally out of contact one with the other, and said treads having on their adjacent sides parts arranged to contact one with the other when said units are inflated.

2. A pneumatic tire comprising two separately deflatable units, means for mounting said units side by side on a vehicle wheel, each unit having a casing provided with a tread having a substantially flat road engaging surface and the tread of each casing having on that side thereof adjacent the other tread a contact surface, said contacting surfaces being arranged to have firm contact one with the other when the tire is inflated and thus provide said tire with a continuous and substantially flat road engaging surface.

3. A pneumatic tire comprising two separately deflatable units, means for mounting said units side by side on the wheel of a vehicle, each unit having a casing provided with a tread and the tread of each casing having a lateral extension projecting beyond the adjacent portion of the side wall of that casing toward the tread of the other casing, said extensions being so arranged that they will contact one with the other when the tire is inflated.

4. A pneumatic tire comprising two separately deflatable units, means for mounting said units side by side on the wheel of a vehicle, each unit including a casing having a tread, the adjacent side walls of said casing being normally spaced one from the other and the tread portions of said casing having parts arranged to contact one with the other when said tire is inflated and while the adjacent side walls of said casing are out of contact one with the other.

5. A pneumatic tire comprising two separately deflatable units, means for mounting said units side by side on the wheel of a vehicle, each unit having a casing provided with a tread and the tread of each casing having on that side thereof adjacent to the other tread a contact surface, said contact surfaces being arranged to have firm contact one with the other when the tire is inflated and said casing being so shaped that when said treads are in contact the adjacent side walls of said casing will be normally out of contact and said tire will have substantially the shape of and appearance of a single tire.

6. A pneumatic tire comprising two separately deflatable units, each unit including a casing having a tread, each casing being substantially oval in cross section with its major axis extending radially, and means for mounting said casing side by side on the wheel of a vehicle in spaced relation one with the other, said treads having laterally extending parts arranged to contact one with the other when said tire is inflated and while the adjacent side walls of said casing are spaced one from the other.

7. In a pneumatic tire comprising two separately deflatable units adapted to be mounted side by side on a vehicle wheel, each unit having a casing provided with a tread, and the treads of the two casings having at their adjacent sides cooperating contact surfaces arranged to have firm contact one with the other when said units are inflated, and said treads also having adjacent to the respective contact surfaces substantially flat road engaging portions arranged to form a continuous road engaging portion for the two units when the latter are inflated and extending for at least a portion of the combined width of the two treads.

HERBERT R. SIMONDS.